(12) United States Patent
Parikh

(10) Patent No.: US 9,178,728 B2
(45) Date of Patent: Nov. 3, 2015

(54) TRANSMITTER WITH HIGH FREQUENCY AMPLIFICATION

(71) Applicant: FUJITSU LIMITED, Kawasaki-shi, Kanagawa (JP)

(72) Inventor: Samir Parikh, Los Gatos, CA (US)

(73) Assignee: FUJITSU LIMITED, Kawasaki (JP)

( * ) Notice: Subject to any disclaimer, the term of this patent is extended or adjusted under 35 U.S.C. 154(b) by 53 days.

(21) Appl. No.: 13/941,343

(22) Filed: Jul. 12, 2013

(65) Prior Publication Data
US 2015/0015318 A1    Jan. 15, 2015

(51) Int. Cl.
*H04L 25/02*    (2006.01)
*H04L 25/03*    (2006.01)

(52) U.S. Cl.
CPC ...... *H04L 25/03343* (2013.01); *H04L 25/0272* (2013.01)

(58) Field of Classification Search
CPC ............................ H03G 3/3036; H03G 3/3042
USPC ......... 327/109, 108, 111, 112, 134, 165, 170, 327/178, 179, 355, 361, 551, 559; 326/29
See application file for complete search history.

(56) References Cited

U.S. PATENT DOCUMENTS 7,200,371 B1 *   4/2007   Huffstetler, Jr. ........... 455/127.2
8,275,026 B2 *   9/2012   Lee ............................... 375/229

OTHER PUBLICATIONS

Marcel Kossel, et al., "A T-Coil-Enhanced 8.5 Gb/s High-Swing SST Transmitter in 65 nm Bulk CMOS With < -16 dB Return Loss over 10Ghz Bandwidth", in IEEE J. Solid-State Circuits, vol. 43,No. 12,pp. 2905-2920, Dec. 2008.
Christian Menolfi, et al., "A 14Gb/s High-Swing Thin-Oxide Device SST TX in 45nm CMOS SOI", in ISSCC Dig. Tech. Papers, Feb. 2011.
Jintae Kim, et al., "An 8Gb/s Transformer-Boosted Transmitter with >VDD SWING", in ISSCC Dig. Tech. Papers, Feb. 2006.

* cited by examiner

*Primary Examiner* — Jung Kim
(74) *Attorney, Agent, or Firm* — Maschoff Brennan

(57) ABSTRACT

A transmitter may include a first path configured to receive a signal, to attenuate the low frequency components of the signal, and to output the low frequency component attenuated signal. The transmitter may further include a second path configured to receive the signal, to amplify the signal, and to output the amplified signal. The transmitter may also include a node coupled to the first path and the second path and configured such that the low frequency component attenuated signal and the amplified signal combine at the node.

19 Claims, 6 Drawing Sheets

TRANSMITTER WITH HIGH FREQUENCY AMPLIFICATION

FIELD

The embodiments discussed herein are related to transmitter circuits.

BACKGROUND

Integrated circuits typically have dedicated interface circuits to communicate with other integrated circuits and other systems. Some dedicated interface circuits employ current mode transmitters that drive currents between integrated circuits. Signals that travel from one integrated circuit to another are becoming faster and faster.

As signal speeds increase, the effect of imperfect "channels" also increases. A "channel," for the purposes of this description, is any medium that the signal passes through. For example, a channel may include printed circuit board traces or wires routed between integrated circuits. One possible effect of an imperfect channel is frequency-dependent attenuation of signal amplitudes. In general, when the signal amplitude is attenuated as a function of frequency, the signal becomes smaller as the speed increases. When the signal gets too small, communications between integrated circuits may become unreliable.

One known method for compensating for frequency-dependent attenuation is the use of pre-emphasis at the transmitter. Pre-emphasis at the transmitter involves cutting the signal after a signal level change to cause the signal to achieve a higher voltage at a signal change. However, pre-emphasis reduces eye height of the signal.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a transmitter may include a first path configured to receive a signal, to attenuate the low frequency components of the signal, and to output the low frequency component attenuated signal. The transmitter may further include a second path configured to receive the signal, to amplify the signal, and to output the amplified signal. The transmitter may also include a node coupled to the first path and the second path and configured such that the low frequency component attenuated signal and the amplified signal combine at the node.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

According to an aspect of an embodiment, a transmitter configured to transmit a signal along a transmission line from a data circuit to a receiving circuit may include first and second paths. The signal may be sent along both the first and second paths before being transmitted along the transmission line. In the first path, low frequency components of the signal may be attenuated. In the second path, all of or a majority of the frequency components of the signal may be amplified. The first and second paths may be coupled such that the signal with the attenuated low frequency components from the first path and the signal amplified in the second path may be combined and transmitted along the transmission line as a transmitted signal. As a result, the transmitted signal may have high frequency components with magnitudes larger than the magnitudes of the high frequency components of the signal before being received by the transmitter. The transmitted signal having high frequency components with larger magnitudes may result in edges of the transmitted signal at the receiving circuit that are sharper and transition faster than edges of a signal that does not have amplified high frequency components.

Embodiments of the present invention will be explained with reference to the accompanying drawings.

Figure 1:
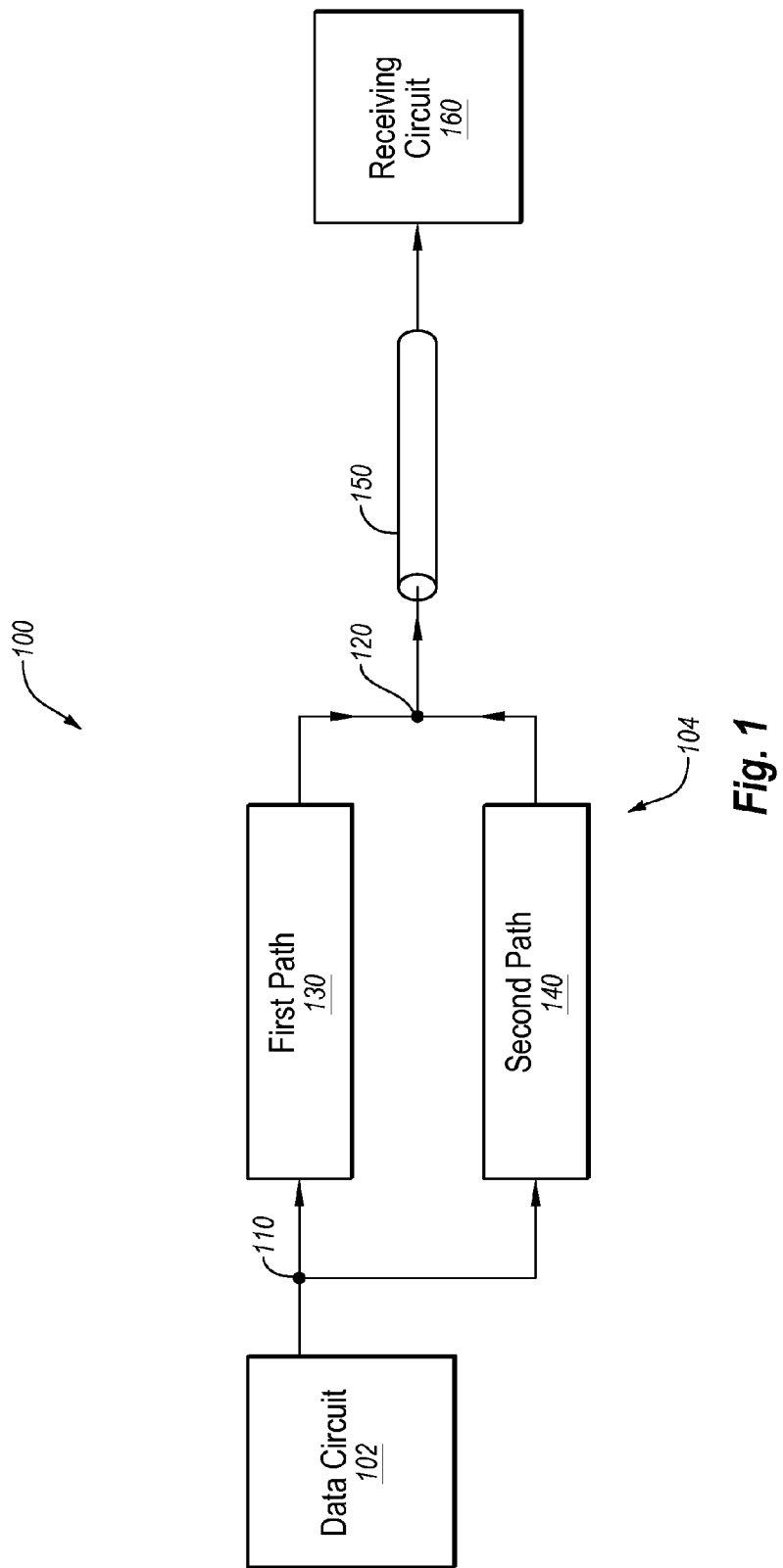
FIG. 1 is a block diagram of an example circuit that includes a transmitter.

FIG. 1 is a block diagram of an example circuit 100 that includes a transmitter 104, arranged in accordance with at least one embodiment described herein. The circuit 100 includes a data circuit 102, a transmitter 104, and a receiving circuit 160.

The data circuit 102 may be coupled to the transmitter 104 at a first node 110 of the transmitter 104. The receiving circuit 160 may be coupled to the transmitter 104 at a second node 120 of the transmitter 104 by way of a transmission line 150. The transmission line 150 may be a printed circuit board (PCB) trace, a coaxial cable, or some other type of transmission line 150.

The transmitter 104 may include a first path 130 and a second path 140. The first path 130 and the second path 140 may be coupled to both the first node 110 and the second node 120. More particularly, the first path 130 and the second path 140 may be electrically coupled in parallel between the first and second nodes 110 and 120.

The first node 110 of the transmitter 104 may be configured to receive a signal from the data circuit 102 and to send the signal along both the first path 130 and the second path 140. The signal may be a high speed or low-speed signal. For example, in some embodiments, the signal may be a 200 megabits/second signal, a 500 megabits/second signal, a 1 gigabit/second signal (Gb/s), a 10 Gb/s signal, a 20 Gb/s signal, or a 40 Gb/s signal, among others. In some embodiments, the first node 110 may be configured to receive a differential signal pair. In some embodiments, the first node 110 may include a circuit component configured to direct the signal along the first and second paths 130 and 140.

The first path 130 may be configured to receive a signal from the first node 110 and output a first path signal at the second node 120. The first path 130 may be further configured such that high frequency components of the first path signal are amplified as compared to low frequency components of the first path signal. For example, a signal magnitude ratio between the magnitudes of high frequency components of the signal received at the first path 130 and magnitudes of low frequency components of the signal received at the first path 130 may have a first value. Additionally, a first path signal output magnitude ratio between the magnitudes of high frequency components of a first path signal output by the first path 130 and magnitudes of low frequency components of the first path signal output by the first path 130 may have a second value. As used herein, amplifying of the high frequency components as compared to the low frequency components of the signal may indicate that the signal magnitude ratio is different than the first path signal output magnitude ratio. In particular, the first path signal output magnitude ratio may be larger than the signal magnitude ratio.

High and low frequency components of a signal may be defined based on one or more characteristics of the signal, such as a symbol rate of the signal. For example, in some embodiments, a symbol rate of a signal may have a corresponding sampling rate. The low frequency components of the signal may be frequency components between 0 Hz and one-half of the sampling rate at which the signal is sampled or one-half the symbol rate of the signal. The high frequency components of the signal may be frequency components that are higher than one-half of the sampling rate at which the signal is sampled or one-half the symbol rate of the signal. For example, assume the symbol rate of the signal is 10 gigabytes/second (Gb/s). The sampling rate (Fs) is then 10 GHz to allow for one sample to be captured per period to determine when the signal, which may be a square wave, is high or low. As a result, the low frequency components of the signal may be between 0 Hz and 5 GHz and the high frequency components of the signal may be higher than 5 GHz.

In some embodiments, not all high frequency components of the signal may be amplified or considered. In these and other embodiments, the high frequency components that may be adjusted by the transmitter may be at least the frequency components between one-half the sampling rate and the sampling rate of the signal. For example, in the previous example, the high frequency components that may be adjusted by the transmitter may be at least the frequency components between 5 GHz and 10 GHz.

In other embodiments, the high and low frequency components of the signal may be defined in a different manner. The exact dividing point for high and low frequency components may vary based on the use of the transmitter and other factors. What is contemplated in the description herein with reference to high and low frequency components is a grouping of frequency components of a signal into two groups, high and low, and amplifying the high frequency components in the first path 130 with respect to the low frequency components.

In some embodiments, amplifying high frequency components of a signal with respect to low frequency components of the signal may be accomplished by attenuating the low frequency components of the signal. Alternately or additionally, the high frequency components of a signal may be amplified. Alternately or additionally, all of or a majority of the frequency components of the signal may be amplified and then the low frequency components of the signal may be attenuated. In these and other embodiments, the low frequency components of the signal may be attenuated more than the low frequency components are amplified.

The second path 140 may be configured to receive the signal from the first node 110 that is received by the first path 130 and to output a second path signal at the second node 120. The second path 140 may be further configured to amplify all of or a majority of the frequency components of the signal from the first node 110. In some embodiments, the second path 140 may include components to improve impedance matching with the transmission line 150 among other types of components. In these and other embodiments, the second path 140 may be configured in a similar manner as known transmitters.

The second node 120 may be coupled to both the first path 130 and the second path 140. The second node 120 may be configured to receive the first path signal from the first path 130 and the second path signal from the second path 140. The second node 120 may be further configured to combine the first path signal with the second path signal. The combined first and second path signals may be transmitted along the transmission line 150 and may be referred to herein as the "transmitted signal."

As a result of combining the first and second path signals to form the transmitted signal, the high frequency components of the first path signal combine with the high frequency components of the second path signal such that the high frequency components of the transmitted signal have a larger voltage swing than the low frequency components of the transmitted signal. The high frequency components of the transmitted signal having a larger voltage swing than the low frequency components result in a form of a pre-emphasis being applied to the transmitted signal by the transmitter 104. The transmitter 104 applies a pre-emphasis to the transmitted signal by amplifying the high frequency components of the transmitted signal with respect to the low frequency components of the transmitted signal. Thus, the pre-emphasis of the transmitted signal applied by the transmitter 104 does not reduce an eye-height of the transmitted signal or use high voltage rails that occurs when known transmitters apply pre-emphasis to a transmitted signal. The pre-emphasis applied by the transmitter 104 is further illustrated and described with respect to FIGS. 2A-2B.

Modifications, additions, or omissions may be made to the circuit 100 without departing from the scope of the present disclosure. For example, in some embodiments, the second node 120 may include a circuit component configured to combine the first path signal and the second path signal. For example, in some embodiments, the second node 120 may include a coupler, an adder, a summer, or some other circuit component configured to combine two signals. Alternately or additionally, the first path 130 and the second path 140 may each include one or more active and/or passive circuit components. Note also that, as used herein, "coupled to" is defined to mean both a direct connection between two or more circuit objects without any intervening circuit objects and an indirect connection between two or more circuit objects with one or more intervening circuit objects. For example, two circuit objects directly connected to each other are "coupled to" one another. The same two circuit objects would also be "coupled to" each other if there were one or more intervening circuit objects connected between them.

Figure 2A:
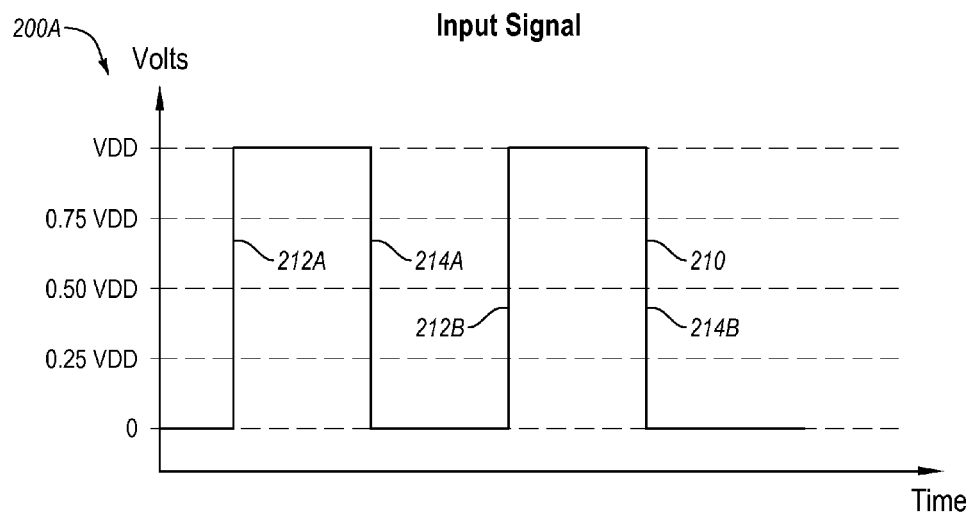
FIG. 2A illustrates an example input signal to a transmitter.
Figure 2B:
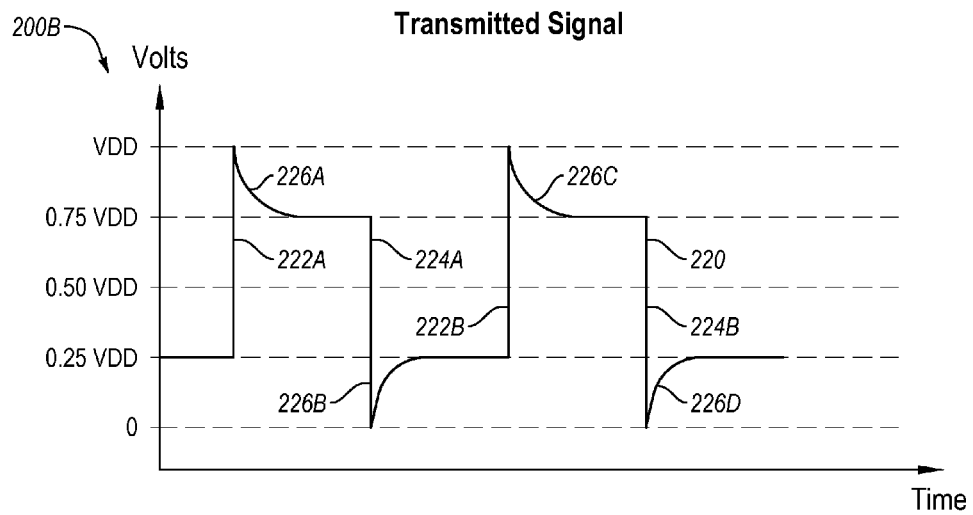
FIG. 2B illustrates an example transmitted signal transmitted by a transmitter.

FIG. 2A illustrates an example input signal 210 to a transmitter and FIG. 2B illustrates an example transmitted signal transmitted by the transmitter, arranged in accordance with at least one embodiment described herein. The input signal 210 is illustrated in graph 200A of FIG. 2A and the transmitted signal 220 is illustrated in graph 200B of FIG. 2B. The transmitter receiving the input signal 210 and transmitting the transmitted signal 220 may be similar and/or configured according to the transmitter 104 of FIG. 1.

As illustrated in FIG. 2A, the input signal 210 includes first and second rising edges 212A and 212B, referred to as rising edges 212, and first and second falling edges 214A and 214B, referred to as falling edges 214. During the rising edges 212, a voltage of the input signal 210 rises from 0 volts (V) to a voltage level (VDD). During the falling edges 214, the voltage of the input signal 210 falls from VDD to 0V.

Note that rising and falling edges of the signal may be achieved using high frequency components of the signal. When magnitudes of high frequency components of a signal are attenuated, nonexistent, and/or limited, a slope of the rising and falling edge of the signal may be reduced. High frequency components of the signal may be attenuated, nonexistent, and/or limited by transmission of a signal. For example, a transmission line may attenuate high frequency components of the signal. In particular, a transmission line may attenuate high frequency components more than low frequency components of a signal. As a result, when the signal is received after being transmitted, the slope of the rising and falling edges of the signal may be reduced, leading to skewing and other problems recovering the signal.

To compensate for the attenuation of high frequency components of a signal, a transmitter, such as the transmitter 104 of FIG. 1, may apply a pre-emphasis to the transmitted signal 220 illustrated in the graph 200B of FIG. 2B by amplifying the high frequency components of the input signal 210 as described with respect to FIG. 1. That is, the high frequency components of the transmitted signal 220 may be amplified, e.g., increased in magnitude, before the transmitted signal 220 is transmitted.

Similar to the input signal 210, the transmitted signal 220 may include first and second rising edges 222A and 222B, referred to as rising edges 222, respectively, and first and second falling edges 224A and 224B, referred to as falling edges 224. With the high frequency components of the transmitted signal 220 amplified, the transmitted signal 220 may also include spikes 226A and 226C at the first and second rising edges 222A and 222B, respectively, and spikes 226B and 226D at the first and second falling edges 224A and 224B, respectively, of the transmitted signal 220. The spikes 226A, 226B, 226C, and 226D, may be collectively referred to herein as the spikes 226. The spikes 226 may result from the pre-emphasis that is applied to the transmitted signal 220.

During the rising edges 222, a voltage of the transmitted signal 220 starts at 0.25 VDD and settles at 0.75 VDD after spiking at a voltage higher than 0.75 VDD. In the illustrated embodiment, the transmitted signal 220 spikes to VDD at the rising edges 222, but the spikes 226A and 226C may be less than or more than VDD in other embodiments. During the falling edges 224, the voltage of the transmitted signal 220 starts at 0.75 VDD and settles at 0.25 VDD after spiking at a voltage lower than 0.25 VDD. In the illustrated embodiment, the transmitted signal 220 spikes to 0V at the falling edges 224, but the spikes 226B and 226D may be more than or less than 0V in other embodiments.

The transmitted signal 220 may not have a voltage swing as large as the voltage swing of the input signal 210 for the entire transmitted signal 220. In particular, as illustrated, after the transmitted signal 220 settles from the spikes 226, the voltage swing of the transmitted signal 220 is around 0.5 VDD instead of the voltage swing of VDD for the input signal 210. The reduced voltage swing in the transmitted signal 220 is typically a result of the limited capabilities of components in the transmitter that generate the transmitted signal 220 based on the input signal 210.

By amplifying the high frequency components of the transmitted signal 220, the voltage swing of the high frequency components of the transmitted signal 220 may be greater than the voltage swing of the level portions of the transmitted signal 220 that are due to the low frequency components of the transmitted signal 220. In the illustrated embodiment, the voltage swing of the high frequency components is VDD as compared to the voltage swing of the low frequency components of the transmitted signal 220 of 0.5 VDD.

By amplifying the high frequency components of the transmitted signal 220 as compared to the low frequency components of the transmitted signal 220, when the high frequency components of the transmitted signal 220 are attenuated more during transmission of the transmitted signal 220 than the low frequency components, the relationship between the high frequency components and the low frequency components of the transmitted signal 220 after being received by a receiver is more analogous to the relationship to the high frequency components and the low frequency components in the input signal 210. The relationship between the high frequency components and the low frequency components of the received transmitted signal 220 being more analogous to the relationship to the high frequency components and the low frequency components in the input signal 210 may reduce skew in the received transmitted signal and/or may reduce problems a receiver may have in recovering the input signal 210.

Figure 3:
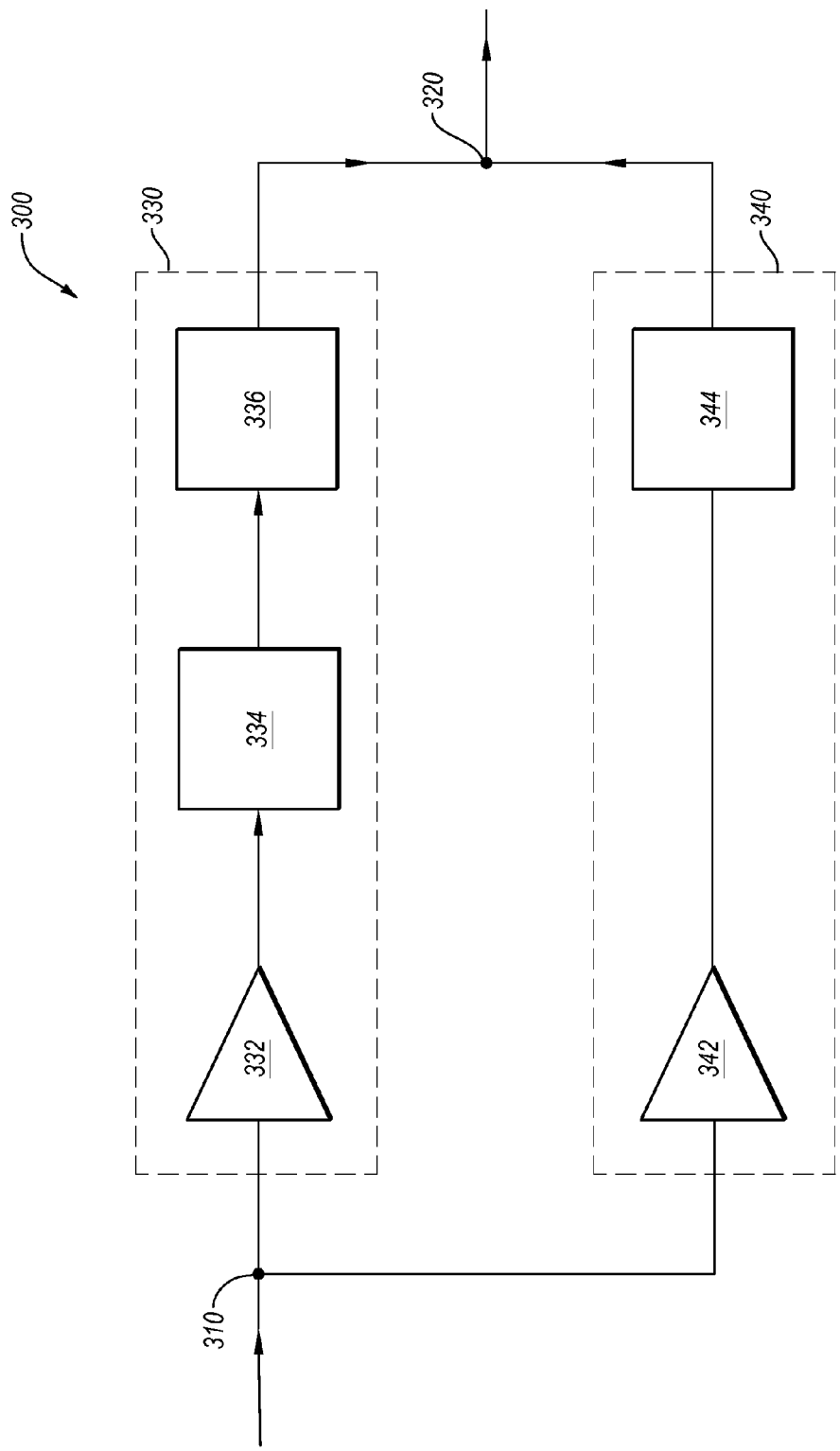
FIG. 3 is a block diagram of an example transmitter.

FIG. 3 is a block diagram of an example transmitter 300, arranged in accordance with at least one embodiment described herein. The transmitter 300 includes a first node 310, a second node 320, and first and second paths 330 and 340 electrically coupled in parallel between the first and second nodes 310 and 320. The transmitter 300 may be an embodiment of the transmitter 104 of FIG. 1.

The first node 310 may be configured to receive a signal and to distribute the signal to the first and second paths 330 and 340.

The first path 330 may include an amplifier 332, a boosting circuit 334, and a high-pass filter 336 and may be configured to amplify high frequency components of the signal with respect to the low frequency components of the signal. The amplifier 332 may be coupled to the first node 310 and may be configured to receive a signal from the first node 310. The amplifier 332 may be further configured to amplify the signal. The amplifier 332 may be a single amplifier and/or another circuit element, such as a passive and/or active circuit element. Alternately or additionally, the amplifier 332 may be an amplifier chain that includes multiple amplifiers or circuit elements. In some embodiments, the amplifier 332 may amplify the high frequency components of the signal. Alternately or additionally, the amplifier 332 may amplify all of or a majority of the frequency components of the signal.

The boosting circuit 334 may be coupled to the amplifier 332 and may be configured to receive the amplified signal from the amplifier 332. The boosting circuit 334 may also be configured to further amplify high frequency components of the amplified signal.

The high-pass filter 336 may be coupled to the boosting circuit 334 and the second node 320 and may be configured to receive the amplified signal from the boosting circuit 334. The high-pass filter 336 may be further configured to filter the amplified signal by attenuating the low frequency components of the amplified signal. In some embodiments, the high-pass filter 336 may filter the lower frequency components more than, less than, or equal to an amount the low frequency components of the signal are amplified by the amplifier 332. The filtered amplified signal may be referred to as a first path signal and sent to the second node 320 by the high-pass filter 336.

The second path 340 may include an amplifier 342 and an impedance 344 and may be configured to amplify the signal. The amplifier 342 may be coupled to the first node 310 and the impedance 344 and may be configured to receive a signal from the first node 310. The amplifier 342 may be a single amplifier and/or other circuit elements, such as passive and/or active circuit elements. Alternately or additionally, the amplifier 342 may be an amplifier chain that includes multiple amplifiers or circuit elements. The signal received by the amplifier 342 may be the same signal received by the amplifier 332 of the first path 330. The amplifier 342 may be configured to amplify the signal. In some embodiments, the amplifier 342 may amplify all of or a majority of the frequency components of the signal. In some embodiments, the amplifier 342 may amplify the signal with an amplification that is similar to an amplification applied by the amplifier 332 to the signal in the first path 330. Alternately or additionally, the amplification applied by the amplifier 332 and the amplifier 342 may be different.

The impedance 344 may be coupled to the amplifier 342 and the second node 320 and may be configured to receive the amplified signal from the amplifier 342. The impedance 344 may be a single circuit element or a combination of multiple circuit elements. The impedance 344 may pass the amplified signal to the second node 320. The impedance 344 may be used to match an impedance of the transmitter 300 to a device and/or a component, e.g., a transmission line, coupled to the second node 320. The amplified signal passed to the second node 320 may be referred to as the "second path signal."

The second node 320 may be configured to receive the first path signal and the second path signal and to combine the first and second path signals into a transmitted signal. The transmitted signal may be output by the transmitter 300. Thus, the high frequency components of the transmitted signal may be amplified in relation to the low frequency components of the transmitted signal.

Modifications, additions, or omissions may be made to the transmitter 300 without departing from the scope of the present disclosure. For example, the second node 320 may include a component configured to combine the first and second path signals. Alternately or additionally, the first and second paths may include fewer or more components than those illustrated in FIG. 3. For example, the transmitter 300 may include additional passive or active circuit elements.

Figure 4:
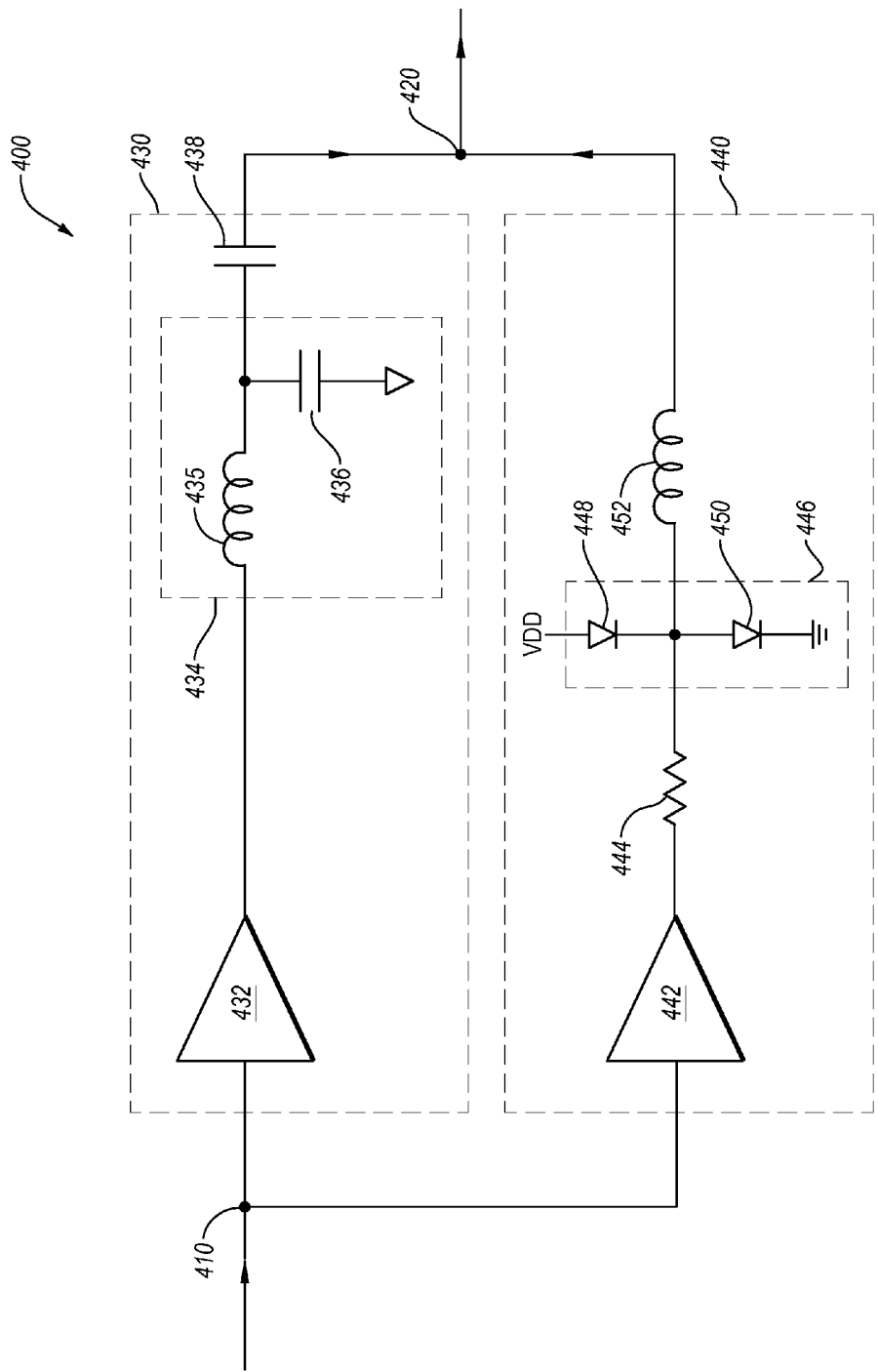
FIG. 4 is a circuit diagram of another example transmitter.

FIG. 4 is a circuit diagram of another example transmitter 400, arranged in accordance with at least one embodiment described herein. The transmitter 400 includes a first node 410, a second node 420, and first and second paths 430 and 440 electrically coupled in parallel between the first and second nodes 410 and 420. The transmitter 400 may be an embodiment of the transmitter 104 of FIG. 1.

The first node 410 may be configured to receive a signal and to distribute the signal to the first and second paths 430 and 440.

The first path 430 may include an amplifier 432, a boosting circuit 434, and a capacitor 438 and may be configured to amplify high frequency components of the signal with respect to low frequency components of the signal. The amplifier 432 may be coupled to the first node 410 and may be configured to receive the signal from the first node 410. The amplifier 432 may also be configured to amplify the signal. The amplifier 432 may be a single amplifier and/or another circuit element, such as a passive and/or active circuit element. Alternately or additionally, the amplifier 432 may be an amplifier chain that includes multiple amplifiers or circuit elements. In some embodiments, the amplifier 432 may amplify the high frequency components of the signal. Alternately or additionally, the amplifier 432 may amplify all of or a majority of the frequency components of the signal.

The boosting circuit 434 may be coupled to the amplifier 432 and be configured to receive the amplified signal from the amplifier 432. The boosting circuit 434 may include an inductor 435 coupled between the capacitor 438 and the amplifier 432 and a boosting capacitor 436 coupled between ground and the inductor 435 and the capacitor 438. The boosting circuit 434 may be configured to further amplify high frequency components of the amplified signal. The inductance of the inductor 435 and the capacitance of the boosting capacitor 436 may be selected based on the frequency components of the amplified signal to be amplified.

The capacitor 438 may be coupled to the boosting circuit 434 and the second node 420 and may be configured to receive the amplified signal from the boosting circuit 434. The capacitor 438 may attenuate the low frequency components of the amplified signal. A capacitance of the capacitor 438 may be selected based on the frequency components of the amplified signal that are to be filtered.

The second path 440 may include an amplifier 442, a resistor 444, an electrostatic discharge protection (ESDP) circuit 446, and an inductor 452. The second path 440 may be configured to also amplify the signal received at the first node 410.

The amplifier 442 may be coupled to the first node 410 and the resistor 444 and may be configured to receive the signal from the first node 410. The signal received by the amplifier 442 may be the same signal received by the amplifier 432 of the first path 430. The amplifier 442 may be configured to amplify the signal. The amplifier 442 may be a single amplifier and/or a circuit element, such as a passive and/or active circuit element. Alternately or additionally, the amplifier 442 may be an amplifier chain that includes multiple amplifiers and/or circuit elements. In some embodiments, the amplifier 442 may amplify all of or a majority of the frequency components of the signal.

The resistor 444 may be coupled to the amplifier 442 and the ESDP circuit 446 and may be configured to receive the amplified signal from the amplifier 442. The resistor 444 may pass the amplified signal to the ESDP circuit 446. The resistor 444 may be used to match an impedance of the transmitter 400 to a device and/or a component, e.g., a transmission line, coupled to the second node 420.

The ESDP circuit 446 may be coupled to the resistor 444 and the inductor 452 and may be configured to provide protection from electrostatic current that is received at the second node 420. The ESDP circuit 446 may provide protection by shunting the electrostatic current received at the second node 420 to VDD and/or ground. The ESDP circuit 446 may include first and second diodes 448 and 450. The first diode 448 may be coupled between VDD and the resistor 444 and the inductor 452. The second diode 450 may be coupled between ground and the resistor 444 and the inductor 452. The first and second diodes 448 and 450 may be configured with threshold voltages such that the signal passing through the second path 440 is not shunted to VDD or ground, but an electrostatic discharge received at the second node 420 is shunted to VDD and/or ground.

The inductor 452 may be coupled to the ESDP circuit 446 and the second node 420. The inductor 452 may be configured to pass the amplified signal to the second node 420. The inductor 452 may be used to compensate for a capacitance of the ESDP circuit. The amplified signal passed to the second node 420 may be referred to as the "second path signal."

The second node 420 may be configured to receive the first path signal and the second path signal and to combine the first and second path signals into a transmitted signal. The transmitted signal may be output by the transmitter 400. Thus, the high frequency components of the transmitted signal may be amplified in relation to the low frequency components of the transmitted signal.

Modifications, additions, or omissions may be made to the transmitter 400 without departing from the scope of the present disclosure. For example, the second node 420 may include a component configured to combine the first and second path signals. Alternately or additionally, the first and second paths may include fewer or more components than those illustrated in FIG. 4.

Figure 5:
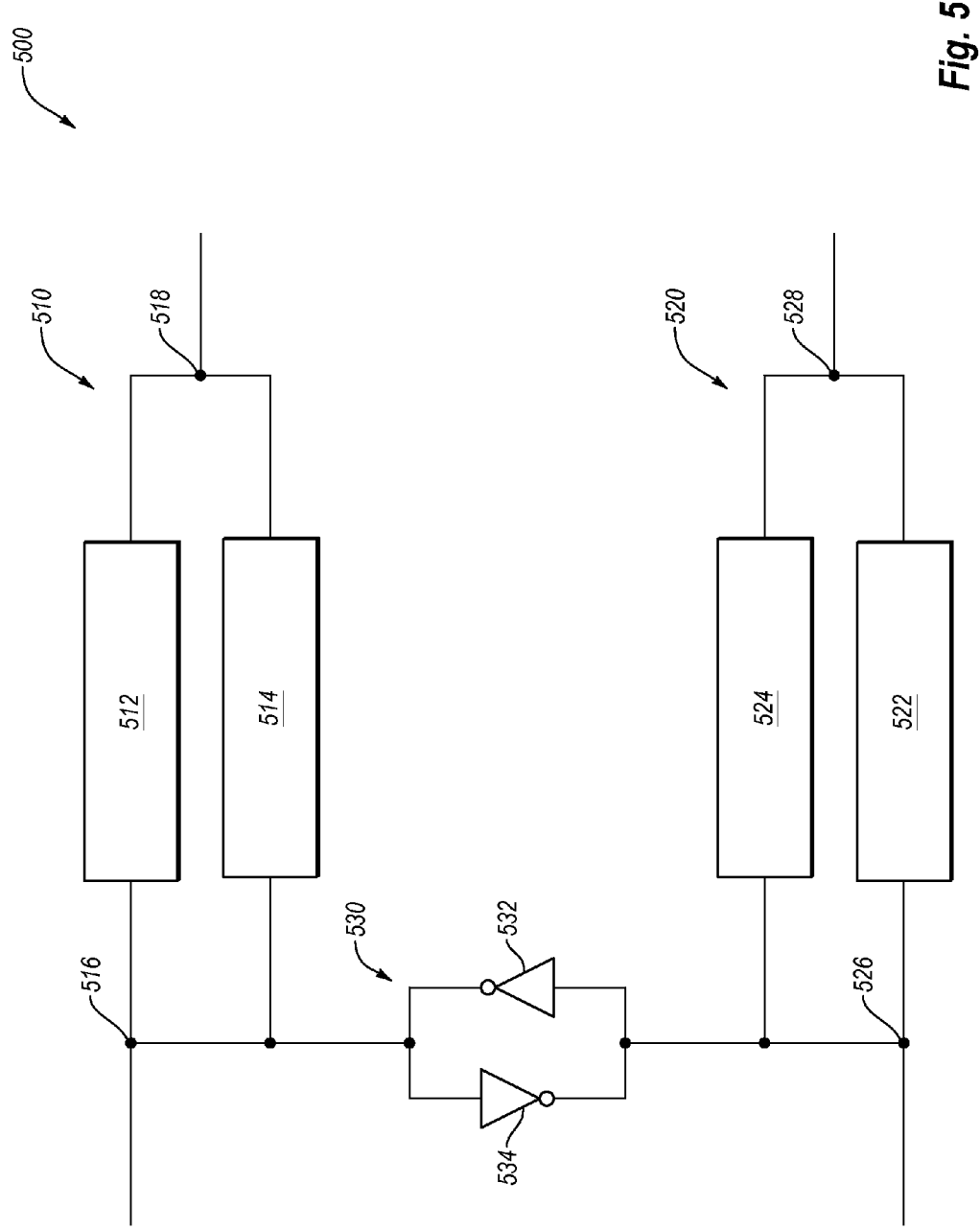
FIG. 5 is a block diagram of an example differential signaling transmitter circuit.

FIG. 5 is a block diagram of an example differential signaling transmitter circuit 500 ("the circuit 500"), arranged in accordance with at least one embodiment described herein. The circuit 500 is configured to transmit a differential signal pair that includes a first signal and a second signal. The circuit 500 includes a first transmitter 510 configured to transmit a first signal of the differential signal pair, for example, the true signal of the differential signal pair, and a second transmitter 520 configured to transmit a second signal of the differential signal pair, for example, the complement signal of the differential signal pair. The circuit 500 further includes a coupling circuit 530 configured to couple the first transmitter 510 and the second transmitter 520.

The first transmitter 510 includes a first path 512, a second path 514, a first node 516, and a second node 518. The first path 512, the second path 514, the first node 516, and the second node 518 may be similar or analogous to any of the first paths 130, 330, and 430, the second paths 140, 340, and 440, the first nodes 110, 310, and 410, and the second nodes 120, 320, and 420 of FIGS. 1, 3, and 4, respectively. The first transmitter 510 may be configured to transmit the first signal of the differential signal pair such that high frequency components of the first signal are amplified with respect to low frequency components of the first signal.

The second transmitter 520 includes a first path 522, a second path 524, a first node 526, and a second node 528. The first path 522, the second path 524, the first node 526, and the second node 528 may be similar or analogous to any of the first paths 130, 330, and 430, the second paths 140, 340, and 440, the first nodes 110, 310, and 410, and the second nodes 120, 320, and 420 of FIGS. 1, 3, and 4, respectively. The second transmitter 520 may be configured to transmit the second signal of the differential signal pair such that high frequency components of the second signal are amplified with respect to low frequency components of the second signal.

The coupling circuit 530 may be configured to couple the second path 514 of the first transmitter 510 with the second path 524 of the second transmitter 520. The coupling circuit 530 may include first and second inverting amplifiers 532 and 534 as illustrated in FIG. 5.

Modifications, additions, or omissions may be made to the circuit 500 without departing from the scope of the present disclosure. For example, the coupling circuit 530 may include additional active and/or passive components.

Figure 6:
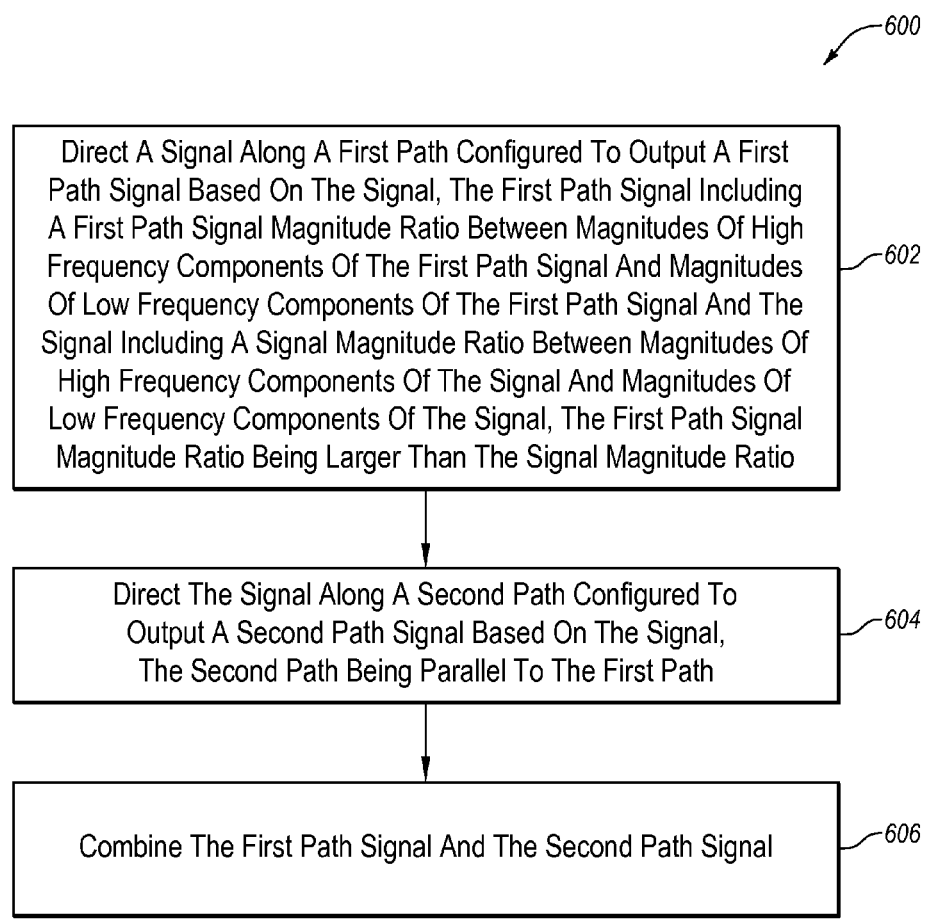
FIG. 6 is a flowchart of an example method of transmitting a signal.

FIG. 6 is a flowchart of an example method 600 of transmitting a signal, arranged in accordance with at least one embodiment described herein. The method 600 may be implemented, in some embodiments, by a circuit or transmitter, such as the circuits or transmitters 100, 300, 400, or 500 of FIGS. 1, 3, 4, and 5, respectively. Although illustrated as discrete blocks, various blocks may be divided into additional blocks, combined into fewer blocks, or eliminated, depending on the desired implementation.

The method 600 may begin at block 602, where a signal may be directed along a first path configured to output a first path signal based on the signal. The first path signal may include a first path signal magnitude ratio between magnitudes of high frequency components of the first path signal and magnitudes of low frequency components of the first path signal. The signal may include a signal magnitude ratio between magnitudes of high frequency components of the signal and magnitudes of low frequency components of the signal. In some embodiments, the first path signal magnitude ratio may be larger than the signal magnitude ratio. In some embodiments, the high frequency components of the signal may have frequencies greater than one-half of a symbol rate of the signal and the low frequency components of the signal may have frequencies between zero and one-half of the symbol rate of the signal.

In block 604, the signal may be directed along a second path configured to output a second path signal based on the signal. The second path may be electrically parallel to the first path. In block 606, the first path signal and the second path signal may be combined.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 600 may further include amplifying the signal along the second path. Alternately or additionally, the method 600 may further include amplifying the signal along the first path. In some embodiments, the method 600 may further include filtering the signal along the first path to attenuate the magnitudes of the low frequency components of the signal. Alternately or additionally, the method 600 may further include amplifying the high frequency components of the signal along the first path.

Although the subject matter herein has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A circuit, comprising:
   a first node configured to receive a signal that includes low frequency components between approximately zero hertz and one-half of a symbol rate of the signal and high frequency components that are between approximately one-half of the symbol rate and the symbol rate of the signal, wherein at least one of the high frequency components is equal to the symbol rate of the signal;
   a first path coupled to the first node and configured to receive the signal from the first node and to output a first path signal based on the signal, the first path including an amplifier configured to amplify all of the high frequency components of the signal received from the first node;
a second path coupled to the first node and configured to receive the signal from the first node, to amplify the low and the high frequency components of the signal, including the at least one of the high frequency components that is equal to the symbol rate of the signal, and to output a second path signal based on the amplified signal, the second path being a single path that is not formed by parallel paths;
a data circuit outputting the signal received by the first node; and
a second node coupled to the first path and the second path and configured such that the first path signal and the second path signal combine at the second node.

2. The circuit of claim 1, wherein the second path comprises one or more of a resistive element, an inductive element, and a second amplifier configured to amplify the signal received from the first node.

3. The circuit of claim 1, wherein the first path further comprises a signal boosting circuit configured to amplify the high frequency components of the signal in the first path.

4. The circuit of claim 1, wherein a first amplification applied to the signal in the first path is different from a second amplification applied to the signal in the second path.

5. The circuit of claim 1, wherein the first path includes a high-pass filter configured to attenuate low frequency components of the signal received from the first node.

6. The circuit of claim 5, wherein the high-pass filter is a capacitor in the first path.

7. The circuit of claim 1, wherein the signal is a first signal in a differential signal pair, the differential signal pair including a second signal.

8. The circuit of claim 7, further comprising:
a third node configured to receive the second signal;
a third path coupled to the third node and configured to receive the second signal from the third node and to output a third path signal, the third path including a second amplifier configured to amplify high frequency components of the second signal received from the third node;
a fourth path coupled to the third node and configured to receive the second signal from the third node and to output a fourth path signal; and
a fourth node coupled to the third path and the fourth path such that the third path signal and the fourth path signal combine at the fourth node.

9. The circuit of claim 8, wherein the second path is coupled to the fourth path.

10. A transmitter, comprising:
a first path configured to receive a signal, the signal including low frequency components between approximately zero hertz and one-half of a symbol rate of the signal and high frequency components that are between approximately one-half of the symbol rate and the symbol rate of the signal, wherein at least one of the high frequency components is equal to the symbol rate of the signal, to amplify all of the high frequency components of the signal, and to output the high frequency component amplified signal;
a second path configured to receive the signal, to amplify the low and the high frequency components of the signal, including the at least one of the high frequency components that is equal to the symbol rate of the signal, and to output the amplified signal, the second path being a single path that is not formed by parallel paths;
a data circuit outputting the signal received by the first path; and
a node coupled to the first path and the second path and configured such that the high frequency component amplified signal and the amplified signal combine at the node.

11. The transmitter of claim 10, wherein the first path is further configured to attenuate low frequency components of the signal in the first path.

12. The transmitter of claim 11, wherein the first path is configured to amplify the signal before attenuating the low frequency components of the signal.

13. The transmitter of claim 10, wherein, the node is a first node, and the first path and the second path are electrically coupled in parallel between the first node and a second node, the second node configured to provide the signal to the first path and the second path.

14. The transmitter of claim 10, wherein the signal is a first signal in a differential signal pair, the differential signal pair including a second signal.

15. A circuit, comprising:
a first node configured to receive a first signal of a differential signal pair;
a first path coupled to the first node and configured to receive the first signal from the first node and to output a first path signal, the first path including a first amplifier configured to amplify high frequency components of the first signal received to generate the first path signal;
a second path coupled to the first node and configured to receive the first signal from the first node and to output a second path signal, the second path including a second amplifier configured to amplify all of the frequency components of the first signal to generate the second path signal;
a second node coupled to the first path and the second path and configured such that the first path signal and the second path signal combine at the second node;
a third node configured to receive a second signal of the differential signal pair;
a coupling circuit configured to electrically couple the first node and the third node, the coupling circuit including:
a first inverter that includes an input electrically coupled to the first node and that includes an output electrically coupled to the third node; and
a second inverter that includes an input electrically coupled to the output of the first inverter and the third node and that includes an output electrically coupled to the input of the first inverter and the first node;
a third path coupled to the third node and configured to receive the second signal from the third node and to output a third path signal, the third path including a third amplifier configured to amplify high frequency components of the second signal to generate the third path signal;
a fourth path coupled to the third node and configured to receive the second signal from the third node and to output a fourth path signal based on the amplified second signal, the fourth path including a fourth amplifier configured to amplify all of the frequency components of the second signal to generate the fourth path signal; and
a fourth node coupled to the third path and the fourth path such that the third path signal and the fourth path signal combine at the fourth node.

16. The circuit of claim 15, wherein the first path includes a high pass filter configured to attenuate low frequency components of the first signal, the high pass filter coupled between the first amplifier and the second node.

17. The circuit of claim 16, wherein the first signal is unfiltered by the first path when the first signal is amplified by the first amplifier.

18. The circuit of claim 15, wherein the third path includes a high pass filter configured to attenuate low frequency components of the second signal, the high pass filter coupled between the third amplifier and the fourth node.

19. The circuit of claim 18, wherein the second signal is unfiltered by the third path when the second signal is amplified by the third amplifier.

* * * * *